Aug. 8, 1944.  O. P. LINDBERG  2,355,451
MATERIAL WORKING TOOL
Filed March 13, 1941  2 Sheets-Sheet 1

INVENTOR
O. P. LINDBERG
BY
E. R. Nowlan
ATTORNEY

Aug. 8, 1944.  O. P. LINDBERG  2,355,451
MATERIAL WORKING TOOL
Filed March 13, 1941  2 Sheets-Sheet 2
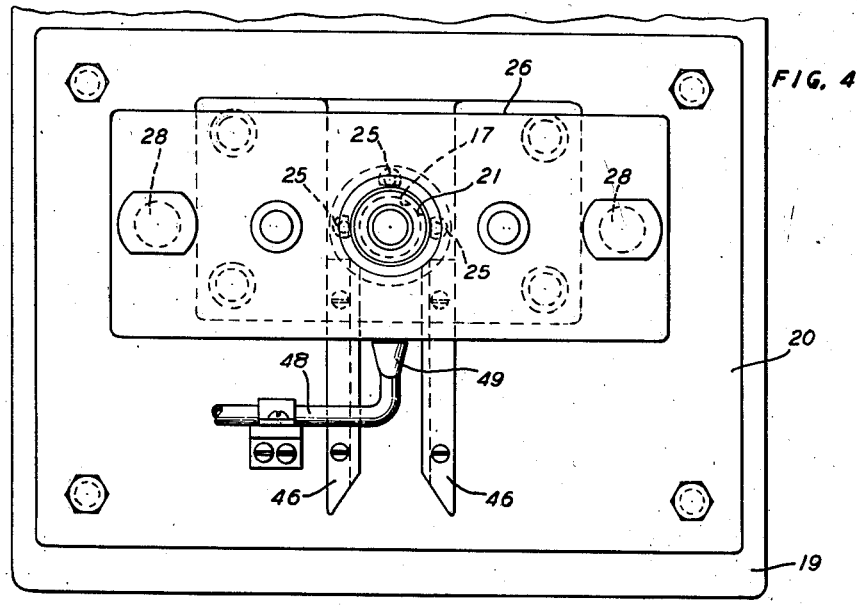
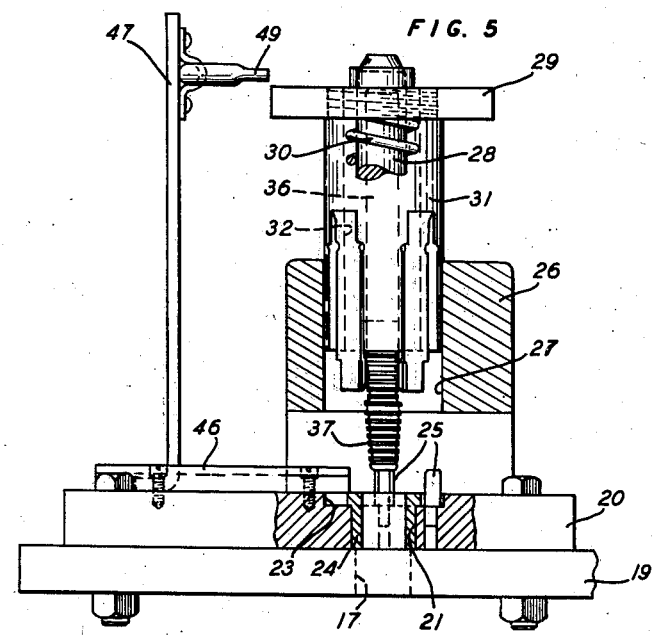
INVENTOR
O. P. LINDBERG
BY
E.R. Nowlan
ATTORNEY Patented Aug. 8, 1944

2,355,451

UNITED STATES PATENT OFFICE 2,355,451

MATERIAL WORKING TOOL

Oscar P. Lindberg, Elizabeth, N. J., assignor to Western Electric Company, Incorporated, New York, N. Y., a corporation of New York Application March 13, 1941, Serial No. 383,085

4 Claims. (Cl. 90—33)

This invention relates to material working tools and more particularly to broaching tools for use with a power press.

Apparatus for forming perforated or annular parts of metal, hard fiber, plastics and other material have been made in many and various forms and with broaching tools mounted and driven in many ways. Generally such apparatus and tools are made for precision work where speed of production may be less important than accuracy. In such machines therefore, in many cases, the broaching tool is rigidly mounted or held during the working stroke; and therefore the removal of the work at the end of the stroke, or the threading of the work upon the tool at the beginning of the stroke may be a more or less elaborate and time consuming matter.

An object of the present invention is to provide tools for material working in which, while the accuracy of production is not materially diminished, the rapidity of successive cycles of operation may be largely increased.

With the above and other objects in view, the invention in one form may be embodied in a broaching tool and auxiliary apparatus to be mounted on the bedplate of an ordinary punch press and to guide and resiliently support an axially oriented axially reciprocable collet adapted to receive and frictionally engage the outer surfaces of an axial column of perforated work parts, together with a broaching tool floating in and supported only by the walls of the bore formed by the perforations of the work parts, and adapted to be driven by the ram of the press.

Other objects and features of the invention will appear from the following detailed description of one embodiment thereof, taken in connection with the accompanying drawings in which the same reference numerals are applied to identical parts in the several figures and in which Fig. 1 is a view in front elevation and partly in vertical central section of a broaching tool and auxiliary apparatus constructed in accordance with the invention;

Fig. 4 is a plan view of the showing of Figs. 1 and 2, and

Fig. 5 is a partial view from the right side of Fig. 2.

Figure 1:
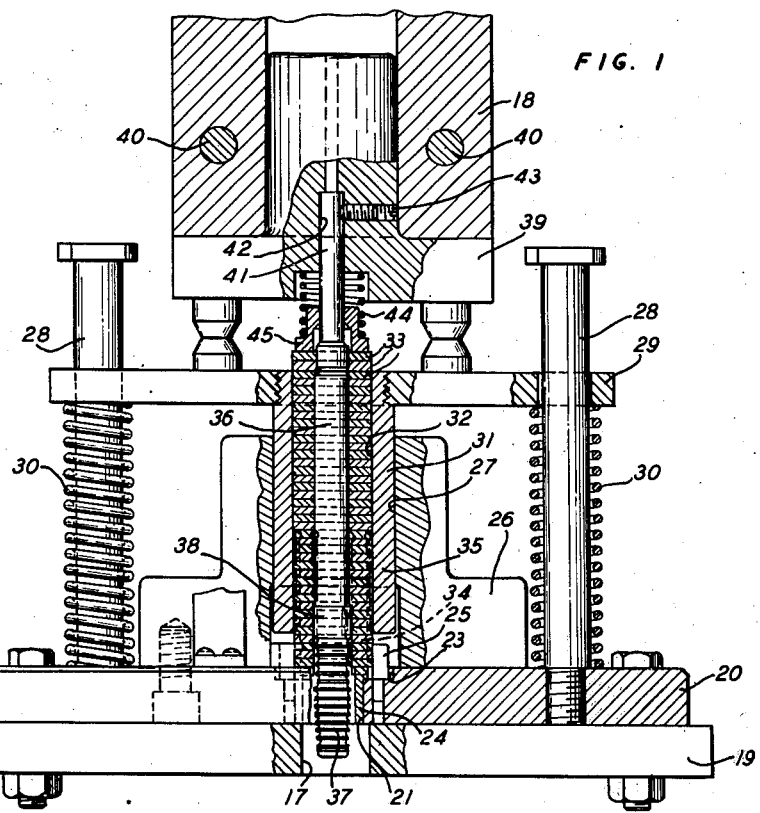

The embodiment of the invention herein disclosed comprises a base 20 formed as a thick, flat, rectangular slab of metal, centrally perforated at 21 and provided with bolts 22 by which it may be removably but rigidly and accurately mounted on the bed 19 of a punch press. The press is of ordinary construction in every respect except for details shown in the drawings. Hence, only a top plate of the bed 19 and the lower end of the ram 18 of the press are shown, these being all that are required for an understanding of the invention. The bed 19 has a central perforation 17 for tool clearance and disposal of chips, the perforation 21 being coaxial with and a little larger than the perforation 17. The perforation 21 is enlarged at its upper end at 23, as by counterboring, to receive an external flange on the upper end of a sleeve 24 seated in the perforation 21 and having a central bore a trifle smaller than the perforation 17 and coaxial therewith. Three positioning stop pins 25 are mounted to stand vertically about the sleeve 24, respectively right and left and in back of the sleeve 24. A block 26 is rigidly mounted on the upper face of the base 20 and is formed with a central vertical bore 27 coaxial with the perforation 21. Two parallel, vertical guide posts 28, 28 are rigidly mounted in the base 20 to stand one on either side of the block 26, and a cross bar 29, suitably perforated, is vertically slidable toward and from the top of the block 26 and on the posts 28, being yieldingly urged upwardly by compression springs 30, 30. The crossbar or slide 29 carries at its center a depending cylindrical sleeve 31, dimensioned externally to slide smoothly and without looseness in the bore 27 of the block 26, and having an axial bore 32 formed and dimensioned to have a snug fit around the external surface of a column composed of superimposed parts to be centrally broached. For simplicity these are here shown as washer like circular disks 33 centrally perforated, and made for example of hard fiber or the like.

Figure 3:
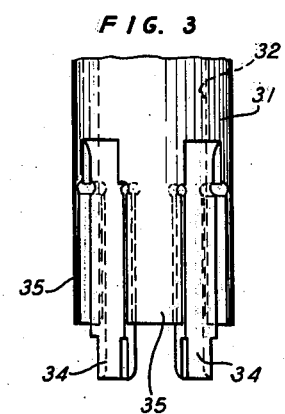
Fig. 3 is an enlarged, detached, broken view of the collet.

The lower end of the sleeve 31 is vertically and radially slotted at a plurality of points around its circumference to form a plurality of down pointing, stiffly resilient fingers 34. Alternate fingers 35 are cut short at the bottom to allow the intercalated fingers 34 to project as best shown in Fig. 3. The fingers 34 are given a radially inward set of a few thousandths of an inch, too little to be shown in the drawings but sufficient to provide a frictional grip of the tips of these fingers 34 on work disks positioned between them.

Under normal working conditions, the entire length of the bore 32 is filled with a column of finished work pieces stacked one on the other as shown. The accurately aligned and broached central perforations of these form an axial bore in which is positioned a broaching tool 36. This is a generally rod shaped element whose lower end 37 is formed with the usual series of sharp edged ridges running circumferentially around, which are the cutting teeth of the tool and are formed in two successive sequences, in each of which the circular teeth increase in diameter from below upwardly to a maximum having the finish diameter of the cut to be taken. Just above this cutting portion is a straight cylindrical portion 38 whose length is equal to the thickness of several (here about three) of the stacked work pieces and whose diameter is such as to give a friction fit in the broached work sufficiently snug to support the tool but without any distortion of the work. Above the supporting portion 38, the broach has a straight cylindrical stem preferably of such diameter as to fit the central perforations of unbroached work pieces in the same manner that the portion 38 fits broached work. Thus, under normal conditions, the tool 36 is supported axially in the sleeve 31, to move therewith, by the frictional grip on the portion 38 of the tool of those work pieces which surround this portion and which, in turn, are supported in the bore 32 by the frictional grip of the fingers 34 on the work pieces below these. Normally the tool is supported and guided wholly and solely by the finished work pieces, these in turn being supported and guided wholly and solely by the walls of the bore 32 and the fingers 34 and 35.

The lower end of the ram of the press is shown at 18. In this a block 39 is removably secured by pins or bolts 40, to be interchangeable for other tools as desired. A vertically disposed driving pin 41 located to be coaxial with the bore 32 and therefore with the tool 36, is secured in a bore 42 in the block 39 by a set screw 43, and extends down below the bottom face of the block 39 to be brought down on and drive down the tool 36 during the working stroke of the ram. The pin 41 is generally a trifle smaller in diameter than the stem or shaft of the tool 36, to have clearance in the broached work. The lower end of the bore 42 is enlarged, as by counterboring, to provide a seat for the upper end of a helical compression spring 44 whose lower end seats against a washer like stripper block 45 slidable on the pin 41 and retained thereon by the slightly enlarged lower end of the pin.

Figure 2:
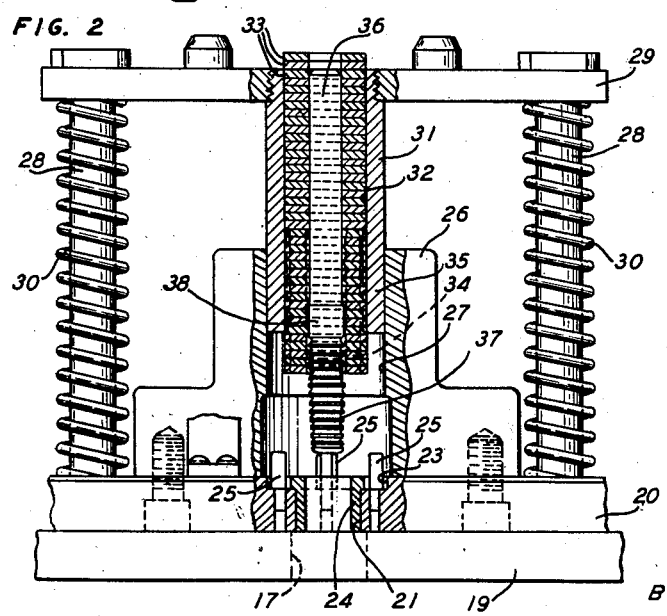
Fig. 2 is a similar view showing parts in another position.

In Figs. 1, 2 and 4, as already noted, the point of view is that of an operator of the machine. Guide rails 46, 46 for the work are mounted on the top surface of the base 20, parallel to each other, and leading from the front part of the base to terminate at such a distance from the rear one of the pins 25 that a work blank stopped against this pin and positioned between the other two pin 25 at right and left, will just safely clear the farther ends of the rails when lifted by the broach 36. The rails are formed with inwardly overhanging top flanges to assist in guiding and confining work pieces pushed along between the rails. In the particular apparatus disclosed these flanges are spaced from the base 20 a distance equal to twice the thickness of the work blanks, so that these are fed to the tool in super-imposed pairs, but this distance may be greater or less according to the circumstances of any given case.

A little to the left of the rails 46, a vertical support 47 carries a compressed air feed tube 48 extending transversely in front of the crossbar or slide 29 and located just above the upper surface of the slide when in its topmost position. The tube is formed with a blast nozzle 49 formed to direct a blast of air from front to back across the top of the slide to blow off any finished work pieces lifted above the slide in normal operation. The tube 47 is fed with compressed air from any suitable source not shown and means may be provided if desired to synchronize intermittent blasts from the nozzle with the upstroke of the ram.

In operation, assuming that there is no work in the machine, a number of blank perforated work pieces is threaded down over the top end of the tool, this having been removed from the machine, to form a stacked column of blanks extending upwardly from the enlarged portion 38 of the tool far enough to suitably support and guide the tool. The tool in the stack of blanks is inserted down into the bore 32 until the tool is about in the position shown in Fig. 2, the press ram being then at the top of its excursion. Work blanks are fed in between the rails 46 in a succession of two high stacks until the first stack is positioned against the three pins 25 to be coaxially under the tool and the press is actuated.

The ram of the press comes down causing the pin 41 to drive the tool 36 down from the position of Fig. 2 to the position of Fig. 1, forcing the working or cutting portion 37 of the tool down through the central perforations of the two blanks stacked under the tool against the stop pins 25 and thus broaching these two blanks. At the same time the block 39 forces the slide 29 down and with it the sleeve 31. The fingers 31 slip down over and grasp the two pieces being broached by their peripheries.

The ram then rises again releasing the slide 29 to be carried up by the springs 30 until stopped by the enlarged heads of the guide posts 28 when the ram leaves the slide and continues up. The sleeve 31 is carried up by the slide and carries with it the column of work pieces contained in the bore 32 and supported by the grip of the fingers 35 on the lowest one, two or more members of the column. The tool 36 in turn is carried up by the frictional grip on its upper portion of the blanks forming the upper part of the column.

By continued repetition of this procedure a column of broached pieces is built up around the tool from its lower end until the upper ones engage the enlarged portion 38 of the tool, when these become the support for the tool. Eventually the column of broached work makes contact with the bottom of the column of blanks on the upper part of the tool. Thereafter the united column is lifted along the tool and in the bore 32 by two pieces of work at each stroke of the ram and the blanks used to guide the tool at first begin to emerge at the top of the bore two at a time. These are blown off by the blast from the nozzle 49, are collected, and fed in among the other blanks at 46 until finished work begins to appear. The stripper block 45 serves to ensure that no blanks or finished pieces are carried up by the ram inadvertently.

It will be seen that by this arrangement each piece of work passes over the tool once only and in one direction only. This is possible because the tool floats freely in the column of work pieces and is not rigidly secured to any supporting member at either end or in any way. Hence the apparatus thus arranged may be operated continuously, without any interruption to remove finished work from the tool or to thread blanks on the tool, and without, on the other hand, stripping finished work backwards from the tool on the return stroke with danger of spoilage.

For simplicity of illustration the invention is herein disclosed in apparatus for broaching washer like work pieces internally. Modifications of the arrangement shown to adapt it for internal broaching of pieces of other peripheral form or having a non-circular perforation to be broached are clearly within the purview of the invention. The embodiment disclosed is illustrative and may be modified and departed from variously without departing from the scope and spirit of the invention as pointed out in and limited only by the appended claims.

What is claimed is:

1. In an apparatus for broaching perforated work pieces, a press having a bed and a ram reciprocable toward and from the same, in combination with a base member stationarily supported on the bed, a block resiliently supported on the base member to be driven by the ram and formed with a bore in axial alignment with the ram to contain and support a stack of perforated work pieces in alignment and a broaching tool to be driven by the ram differentially with respect to the block and supported and guided wholly and solely by the walls of the aligned perforations of the stack of work pieces.

2. In an apparatus for working perforated work pieces, means to contain and support a stack of perforated work pieces in alignment, and a working tool supported and guided wholly and solely by the walls of the aligned perforations of the stack of work pieces, in combination with means to reciprocate the containing and supporting means and the working tool differentially with respect to each other and both in a direction axial to the stack.

3. In an apparatus for broaching perforated work pieces, a member having a bore therein to contain and support a stack of perforated work pieces in alignment and a broaching tool supported and guided wholly and solely by the walls of the aligned perforations of the stack of work pieces, in combination with means to reciprocate the containing and supporting means and the working tool differentially with respect to each other and both in a direction axial to the stack.

4. In an apparatus for broaching perforated work pieces, a stationary base member, a block reciprocable toward and from the base member and having a bore to contain and support a stack of perforated work pieces in alignment, and a broaching tool supported and guided wholly and solely by the walls of the aligned perforations of the stack of work pieces, in combination with means to reciprocate the block and the working tool differentially with respect to each other and both in a direction axial to the stack.

OSCAR P. LINDBERG.